United States Patent
Sommain et al.

(10) Patent No.: US 11,512,028 B2
(45) Date of Patent: Nov. 29, 2022

(54) METHOD FOR DRY BIOLOGICAL TREATMENT OF ORGANIC WASTE

(71) Applicant: SUEZ GROUPE, Paris la Defense (FR)

(72) Inventors: Arnaud Sommain, Mireval (FR); Jean-Luc Martel, Croissy sur Seine (FR)

(73) Assignee: SUEZ GROUPE, Paris la Défense (FR)

( * ) Notice: Subject to any disclaimer, the term of this patent is extended or adjusted under 35 U.S.C. 154(b) by 200 days.

(21) Appl. No.: 16/612,070

(22) PCT Filed: May 9, 2018

(86) PCT No.: PCT/EP2018/061988
§ 371 (c)(1),
(2) Date: Nov. 8, 2019

(87) PCT Pub. No.: WO2018/206634
PCT Pub. Date: Nov. 15, 2018

(65) Prior Publication Data
US 2020/0165172 A1    May 28, 2020

(30) Foreign Application Priority Data
May 10, 2017    (FR) ...................................... 1754067

(51) Int. Cl.
*C05F 9/02*         (2006.01)
*C05F 17/20*        (2020.01)
(Continued)

(52) U.S. Cl.
CPC .................. *C05F 9/02* (2013.01); *A62D 3/02* (2013.01); *B09B 3/00* (2013.01); *C05F 17/00* (2013.01);
(Continued)

(58) Field of Classification Search
None
See application file for complete search history.

(56) References Cited

U.S. PATENT DOCUMENTS 4,255,389 A * 3/1981 Jung ........................ C05F 17/00
                                                    435/290.3
4,684,468 A * 8/1987 De Baere ................ C12M 23/58
                                                    210/603
(Continued)

FOREIGN PATENT DOCUMENTS

CA         2063777 C       6/1995
DE    002204592 A1 *       5/1974   ................ C05F 7/00
(Continued)

OTHER PUBLICATIONS

Hartman et al., "Increase of anaerobic degradation of particulate organic matter in full-scale biogas plants by mechanical maceration", Water Science and Technology 2000, pp. 145-153, vol. 41, No. 3, XP002777441.
(Continued)

*Primary Examiner* — Wayne A Langel
(74) *Attorney, Agent, or Firm* — Nixon & Vanderhye

(57) ABSTRACT

A method for the biological treatment of organic waste containing impurities consisting of non-biodegradable materials, including: • a first step of wet mechanical separation of the non-biodegradable materials present in the abovementioned organic waste in order to obtain a purified organic fraction, • a second step of dehydrating the purified organic fraction in order to obtain a dehydrated purified organic fraction and an effluent, • a third step of dry anaerobic biological treatment of the dehydrated organic fraction in order to obtain organic residues.

13 Claims, 1 Drawing Sheet

(51) Int. Cl.
*C05F 17/00* (2020.01)
*A62D 3/02* (2007.01)
*B09B 3/00* (2022.01)
*C05F 17/90* (2020.01)
*C05F 17/957* (2020.01)

(52) U.S. Cl.
CPC ............ *C05F 17/20* (2020.01); *C05F 17/957* (2020.01); *C05F 17/989* (2020.01)

(56) References Cited

U.S. PATENT DOCUMENTS

| | | | |
|---|---|---|---|
| 5,377,917 A | 1/1995 | Wiljan et al. | |
| 6,824,686 B2 | 11/2004 | Smis et al. | |
| 2010/0264079 A1* | 10/2010 | Begin | C05F 17/00 210/603 |
| 2014/0311198 A1* | 10/2014 | Fulara | C05F 17/00 71/11 |
| 2014/0338411 A1* | 11/2014 | Nunn | C05F 3/00 71/9 |
| 2014/0346108 A1* | 11/2014 | Josse | C05F 7/00 95/263 |
| 2017/0253891 A1* | 9/2017 | Gitschel | B03B 9/06 |
| 2018/0195236 A1* | 7/2018 | Benedek | B09B 3/00 |
| 2018/0361394 A1* | 12/2018 | Banks | D21C 5/02 |
| 2019/0002323 A1* | 1/2019 | Benedek | B09B 5/00 |
| 2020/0101506 A1* | 4/2020 | Josse | B30B 9/06 |
| 2020/0354250 A1* | 11/2020 | Benedek | C02F 3/28 |

FOREIGN PATENT DOCUMENTS

EP 0520172 A1 * 12/1992 ............... C05F 9/00
EP 1261432 B1 7/2004

OTHER PUBLICATIONS

International Search Report, dated Jul. 9, 2018, from corresponding PCT application No. PCT/EP2018/061988.

* cited by examiner

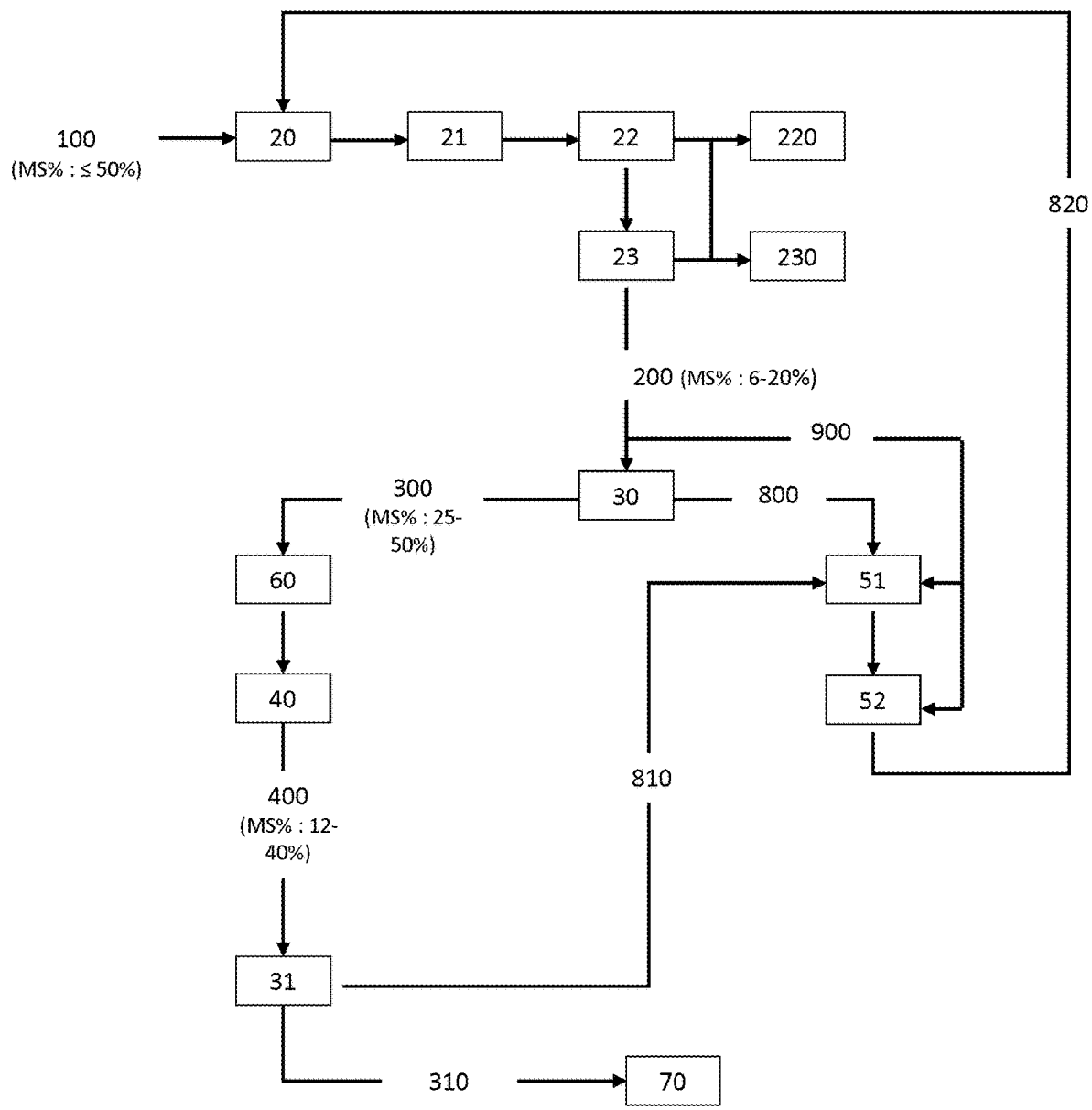

METHOD FOR DRY BIOLOGICAL TREATMENT OF ORGANIC WASTE

The invention relates to a method for dry biological treatment of organic waste with a view to producing, by fermentation of the biogas rich in methane or the like, compounds having an energy or biochemical value and, optionally, with the fermentation residue, to producing a marketable fertilizing material.

To optimize the methanization yield of industrial biological reactors and to ensure the utilization, in agriculture, of by-products originating from an industrial biological treatment of organic waste in reactors, non-biodegradable materials, which are qualified as undesirable, and biodegradable materials have to be separated out.

There are two major categories of industrial biological reactor for a biological treatment:
 fermenters/digesters operating in dry mode, in which the biological reactions will take place with dry matter concentrations of between 12 and 40%;
 fermenters/digesters operating in wet mode, in which the biological reactions will take place with dry matter concentrations of between 1 and 15%.

The techniques for separating out undesirable substances may be applied upstream or downstream of an actual biological treatment in an industrial reactor. These separation techniques may require dilution of the waste and preliminary suspension of the solid fraction in "wet treatment" or direct intervention in "dry treatment". Thus, two separation techniques are currently in use:
 "wet" separation, used upstream of biological reactors operating in wet mode, this being with a liquor generally having a content of less than 15% dry matter inside the biological reactor.
 "dry" separation, generally used upstream of biological reactors operating in dry mode, this being with a liquor generally having a content of more than 15% dry matter inside the biological reactor.

One of the separation techniques operating in dry mode relates to a dry pre-treatment in an aerobic rotating tube, in which a particle-size reduction of the incoming waste by means of mechanical effect and pre-composting with $O_2$ consumption and $CO_2$ release are performed, it being possible for this pre-treatment to involve a residence time ranging from a few hours to a few days and to be followed by adapted steps of mechanical sorting and sorting by particle size. This pre-treatment makes it possible to produce a purified organic material suitable for methanization followed by composting, or for simple composting with, in both cases, utilization, in agriculture, of the final compost, but it is suited only to organic waste having a high dry matter content and containing a significant quantity of paper and card. Furthermore, during the short aerobic degradation that takes place in the rotating tube, a portion of the biodegradable organic material is definitively lost. The purified organic fraction originating from this separation technique can undergo methanization in biological reactors operating in dry mode and may also be suspended in order to be used in biological reactors operating in wet mode.

This type of separation is not effective on wet, sticky organic waste that is collected selectively (biowaste) or in the form of mixed waste (household trash from North Africa and Asia).

Another dry separation technique is sorting by particle size, generally using a 40 to 80 mm mesh. Such sorting is carried out in the dry state on organic waste, which may or may not have undergone preliminary particle size reduction, generally grinding, with or without a supplementary step of ballistic separation of heavy inert substances. This purified organic fraction can be used in anaerobic biological reactors operating in dry mode. However, the technique is not efficient enough when the waste has a high content of undesirable substances, i.e. 15 to 20%, which generally leads to the entry of some of the undesirable substances into the biological reactors. Moreover, if utilization of the digestate in agriculture is envisaged, supplementary treatments are required. This type of separation is not effective on wet, sticky organic waste.

One of the separation techniques adapted to wet, sticky organic waste consists in a wet pre-treatment in association with an initial particle-size reduction, with an aqueous suspension and with one or more particle-size separations, and with different steps of sedimentation/settling. The resulting final suspension is rich in organic material. This suspension contains very few undesirable substances, and between 6 and 12% dry matter. This technique is adapted to wet, sticky organic waste, such as kitchen waste or agrifoodstuff-industry waste, which is often collected in plastic bags. However, owing to the high water content of the fraction resulting from this pre-treatment, it is, however, impossible to associate this technique directly with an anaerobic biological reactor operating in dry mode. The use of an anaerobic biological reactor operating in wet mode is necessary.

In point of fact, the use of an anaerobic biological reactor operating in dry mode or in wet mode necessitates the use of a technique for separating out undesirable substances either in dry mode or in wet mode. In the prior art, there is no method associating a separating-out of undesirable substances carried out in wet mode and a fermentation carried out with the aid of a biological reactor operating in dry mode. Mention may be made, for example, of the method described in patent CA 2063777, which describes a method for treating waste that associates the preparation of a suspension of biogenic substances that can easily be dewatered by means of mechanical separation with anaerobic digestion, but it does not describe the intervening dewatering step.

In terms of industrial infrastructures, the volumes of anaerobic biological reactors operating in wet mode are larger, albeit for an identical substrate load. For an identical organic load, corresponding to the quantity of organic material placed in the biological reactor per cubic meter of reaction material and per day, the volume of reactors operating in wet mode is greater owing to the significant dilution of the waste, on average a volume two to five times as great as that for dry fermenters/digesters. Reactors operating in dry mode are, conversely, more compact and consume less energy owing to a smaller quantity of water to be heated.

In comparison with an anaerobic biological reactor operating in dry mode, an anaerobic biological reactor operating in wet mode produces a larger quantity of water to be treated. Prior to utilization, principally in agriculture, organic residues fermented after a wet anaerobic biological treatment have to undergo a step in which liquid and solid matter are separated out. This separation is generally performed mechanically and the volumes of effluent produced require the provision of correctly sized purification facilities offering a high enough level of performance to be able to recycle all or some of the water to the start of the process and to reject non-recycled volumes into the mains system or into the natural environment. Furthermore, the partial mineralization of organic nitrogen during the phase of fermentation/digestion of the organic waste gives rise to significant quantities of ammoniacal nitrogen in these excess effluents;

this requires treatment, since ammoniacal nitrogen is toxic to bacteria, notably methanogenic bacteria, and must not exceed certain concentrations in anaerobic biological reactors. Treatment of the ammoniacal nitrogen in situ by stripping or by nitrification/denitrification is complex and costly. The use of a biological reactor operating in wet mode always generates a quantity of aqueous effluent laden with ammoniacal nitrogen that requires specific treatment prior to being recycled upstream in the process. Conversely, biological treatment in an anaerobic biological reactor operating in dry mode does not always require a step of separating out liquids and solids, and produces a smaller quantity of effluent. In certain areas around the world, notably in Asia, methanization installations are required to treat very wet organic waste containing few undesirable substances. Current practice involves the use of an anaerobic biological reactor operating in wet mode in association with a step of separating out undesirable substances, which may be performed downstream or upstream of the biological treatment. These solutions present several drawbacks, such as a large footprint, a high level of water and energy consumption, and the production of contaminated effluent which is very costly and complex to treat.

There is thus a need to develop a method for treating wet, sticky waste that is more economical in terms of energy and water and which requires a more compact installation.

Hartman et al. (Water Science and Technology, 2000(41), 3, 145-153) present a study on the relationship between methods for pre-treatment of manure and the yield of biogas from fibers separated out from the manure. Hartman et al. thus describe a method in which: 1) the manure is first macerated and then an effluent from the macerated manure is filtered such as to obtain the fibers, 2) the fibers are then pressed to further reduce the water content in the fibers; and 3) the fibers thus obtained are used for the production of biogas, by means of an anaerobic biological treatment. However, the manure, which is a mixture of litter (straw, fodder, etc.) and animal excrement, cannot be considered to be organic waste containing impurities composed of non-biodegradable materials. Furthermore, the Hartman et al. method does not permit utilization of the organic portion purified by anaerobic biological treatment (biogas production), but the insoluble portion (fibers).

EP 1261432 describes a method for treating solid waste comprising an organic fraction. The method consists in diluting the waste, followed by various sieving operations and the application of magnets. Dewatering, notably by centrifugation, of the purified organic fraction originating from said step of separating out undesirable substances then follows. Said dewatering step results in a purified, dewatered organic fraction that will be subsequently treated in a composting unit or in a fermentation unit if the waste does not originate from a fermentation device. The dewatering step also gives rise to an aqueous fraction composed essentially of the water that will be reinjected upstream of the process in order to dilute the organic waste.

However, this document does not disclose the possibility of combining wet separation with a dry biological treatment.

Furthermore, dewatering by centrifugation is suitable only for a suspension having a dry matter content of less than 25%.

Moreover, owing to the very high speed of rotation of a centrifuge, it is highly sensitive to the presence of abrasive elements in the waste to be pressed and consequently is not a sufficiently robust high-performance system for this type of waste.

An object of the present invention is to propose a technical solution to palliate this shortfall.

The invention relates to a method for biological treatment of organic waste containing impurities composed of non-biodegradable materials, said method comprising:
- a first step of wet mechanical separation of the non-biodegradable materials present in the aforesaid organic waste such as to obtain a purified organic fraction,
- a second step of dewatering said purified organic fraction such as to obtain a purified dewatered organic fraction and an effluent,
- a third step of dry anaerobic biological treatment of the dewatered organic fraction such as to obtain organic residues.

"Organic waste" is understood to mean within the context of the present application all waste, whether sorted or not sorted at source, comprising a solid fraction and composed both of biodegradable organic matter and non-biodegradable matter.

"Biodegradable matter" is understood to mean any waste that can be degraded by a biological (aerobic or anaerobic) treatment.

"Non-biodegradable materials" is understood to mean any waste that cannot be degraded rapidly by biological (aerobic or anaerobic) treatment, i.e. cannot be degraded over a period of less than 5 years and preferably over a period of less than 1 year. Examples of non-biodegradable materials according to the invention are, notably, glass, plastics, textiles, pebbles and fragments of tiles, pottery, etc., and metallic elements.

Within the context of the present invention, the terms "non-biodegradable material", "non-biodegradable matter" and "undesirable substances" or "impurities" are interchangeable.

Preferably, said organic waste is organic waste that is wet and reasonably sticky owing to its nature (vegetable, animal) and its state of preservation, which is connected with the season and with the methods and frequencies of collection employed for small businesses, restauranteurs, industrial facilities or supermarkets, or, also, private individuals.

"Wet mechanical separation" is understood to mean a method of separating out organic waste consisting in an optional first step of grinding/opening of bags and packaging containing the organic waste, followed by a second step of dilution and aqueous suspension, and then by a third step comprising one or more particle-size separations, such as screening and/or sieving, and/or densimetric separations. The aqueous suspension obtained in this wet mechanical separation is characterized, notably, by a relatively low viscosity, such that the suspension may be treated as a weakly viscous liquid. In particular, equipment such as pumps capable of transferring liquids is sufficient for transporting the suspension from one treatment device to another in the installation implementing the method.

The final suspension obtained is purged of undesirable substances and is rich in organic matter. Typically, the final suspension obtained has a content of 2% or less and, notably, of 0.3% or less, by mass relative to the mass of dry matter in the case of plastics having a particle size >5 mm in diameter, and 4% or less and, notably, 0.8% or less, by mass relative to the mass of dry matter in the case of heavy inert waste having a particle size >2 mm in diameter.

In the following text, the dry matter content is expressed as a percentage. The dry matter content corresponds to the MS/MB ratio of the mass of dry matter (MS) obtained after 24 h of drying at 105° C. to the untreated mass (MB), which corresponds to the mass of untreated matter before drying at 105° C., and expressed as a percentage.

"Dewatering" is understood to mean a mechanical process allowing a portion of the liquid phase contained in the suspension to be evacuated and a pasty-to-solid "dewatered" purified organic fraction to be obtained. The dewatered organic fraction is thus relatively viscous, i.e. it cannot be considered to be a liquid. In other words, equipment such as pumps capable of transferring liquids are insufficient for transporting the suspension from one treatment device to another: specific equipment, capable of transferring viscous products, are necessary.

Typically, the dewatering step makes it possible significantly to increase the dry matter content of the purified organic fraction: the purified, dewatered organic fraction (FOED) generally comprises at least 10%, generally at least 15% and up to at least 20 to 25% dry matter (MS) more than the purified organic fraction before dewatering (i.e. on completion of step 1) and prior to step 2), FOE): MS(FOED) =MS(FOE)+10% to 25%. The increase in dry matter varies as a function of the nature of the initial purified organic fraction (i.e. obtained on completion of step 1), its dry matter content and the type of device used to implement this step. A person skilled in the art will, in particular, be able to adapt the device used such as to obtain the increase in dry matter content required.

"Dry anaerobic biological treatment" is understood to mean a treatment using anaerobic fermenters/digesters operating in dry mode, in other words without significant addition of water and dilution, in which anaerobic biological reactions are performed at dry matter contents between 10 and 50%, notably between 12 and 40%.

In one embodiment, the organic waste containing non-biodegradable materials is wet waste having a dry matter content of less than 50%.

In another embodiment, the organic waste containing non-biodegradable materials is waste containing less than 20% non-biodegradable materials (i.e. between 0 and 20% by mass of undesirable-substance dry matter relative to the total dry matter mass of the untreated waste). Typically, organic waste containing non-biodegradable materials is waste containing between 5% and 20% by mass of non-biodegradable-material dry matter relative to the total dry matter mass of the untreated waste.

Organic waste may, in particular, originate from selective collections.

In a more particular embodiment, organic waste containing non-biodegradable materials is waste originating from selective collection containing at most 20% of non-biodegradable materials (i.e. between 0 and 20% by mass of undesirable-substance dry matter, and typically between 5% and 20% by mass of non-biodegradable-material dry matter, these percentages being expressed relative to the total dry matter mass of the untreated waste) and with a dry matter content less than or equal to 30%.

According to the present invention, wet mechanical separation is implemented by means of a variable addition of water to dilute the untreated waste, which is generally recycled, pre-treated water, and by means of at least one means chosen from grinding, particle-size sorting, settling, desilting and flotation.

This step makes it possible to extract undesirable substances from the organic waste such as to obtain a purified organic fraction. The mechanical separation means may be implemented alone or in combination.

By way of example, mention may be made of a grinding means, a grinder or a pulper, which remove fibers from the waste.

As particle-size sorting means, mention may be made of a cylindrical sieve that makes it possible to retain, for example, plastics, or a sand trap, which may be used in this step to separate out heavy non-biodegradable materials such as sand, glass or metals.

The dry matter content of the waste upon completion of the wet mechanical separation step is approximately 6% to 20%, and preferably approximately 8% to 15%.

The implementation of a dewatering step on the purified organic fraction obtained at the end of the wet mechanical separation step makes it possible to reduce the effluent in the purified organic fraction or to eliminate effluent therefrom and to obtain a purified, dewatered organic fraction that can be treated in a biological reactor operating in dry mode.

The dry matter content of the waste on completion of the dewatering step of said purified organic fraction is approximately 25% to 50%, preferably approximately 25% to 35%, and more preferably still approximately 25% to 30%.

According to the present invention, the third step in the method is implemented in an anaerobic biological reactor operating in dry mode, notably an anaerobic fermenter or digester operating in dry mode.

The dry matter content of the waste on completion of the step of dry anaerobic biological treatment is approximately 12% to 40%.

Organic residues originating from the biological reactor may undergo a second dewatering such as to obtain dewatered organic residues.

In an advantageous embodiment of the invention, the purified organic fraction is dewatered by means of mechanical pressing, which is adapted for heterogeneous fluids, fibrous fluids and fluids with a high dry matter content.

Advantageously, mechanical pressing is performed with the aid of a worm-gear opposing a force against a filter or, alternately, a piston exerting a compression force against a filter, the purified organic fraction being pressed against the filter or, optionally, between a plurality of filters. It will thus be possible to use a filter press, notably a piston filter press or, alternately, a plate filter press such as, for example, equipment from the FAURE EQUIPMENT company. It will also be possible to implement mechanical pressing with the aid of a worm-gear press such as, for example, the STRAIN-PRESS press marketed by the HUBER company.

More advantageously, mechanical pressing is implemented by a piston press, such as the Bücher piston press. This type of press makes it possible to extract a significant quantity of water from a purified organic fraction while still preserving the majority of the biodegradable solid elements with a view to treating them in industrial biological reactors operating in dry mode.

As compared with dewatering by centrifugation, a piston press is particularly advantageous since a piston press can work on a suspension having a dry matter content of up to 50% (notably, between 2% and 35%), whereas centrifugation is able generally to work only on a suspension having a dry matter content of less than 25% (notably, between 2% and 15%).

Furthermore, the piston press (notably a piston filter press) is more robust and less sensitive to the presence of abrasive elements in the waste to be pressed as compared to a centrifuge.

According to one embodiment, the method of the present invention further comprises a supplementary step after the second step (dewatering of the purified organic fraction) and prior to the third step (biological treatment), said supplementary step consisting in a step of recirculation of a portion of the effluent obtained on completion of the second step toward the first wet mechanical separation step.

The proportion of effluent to be recycled in the recirculation step is variable, depending on the initial dry matter content of the waste and according to the global method applied. A person skilled in the art will be able to determine these proportions on the basis of general knowledge.

The effluent originating from the second step, notably from pressing, may be more easily recycled to the start of the process.

By virtue of this recirculation, the method of the invention consumes very little water.

Furthermore, ammoniacal nitrogen, which is produced principally during the step of biological treatment in fermenters/digesters, has only a very low presence in the effluent obtained after the step of dewatering the purified organic fraction which is not fermented or slightly fermented.

The effluent obtained after the dewatering step may undergo a biological treatment and/or a physico-chemical treatment prior to being recycled to the first, wet mechanical separation step.

Said biological treatment may be a nitrification/denitrification.

Said physico-chemical treatment may be a stripping treatment and/or an ultrafiltration treatment, and also an inverse osmosis treatment.

These treatments make it possible to further eliminate solid materials in suspension in the effluent. Physico-chemical or biological treatments produce sludges that can be recycled to the dewatering step.

Physico-chemical and/or biological treatment may be applied only to a portion of the effluent obtained in the second step of the method and requires a more compact set-up.

In an advantageous embodiment, the method of the invention comprises a supplementary step of physico-chemical treatment and/or a biological treatment of at least a portion of the effluent prior to recirculation. This supplementary step is implemented after the step of dewatering the purified organic fraction and is aimed at treating the effluent originating from a dewatering device. On completion of the physico-chemical treatment and/or biological treatment, the effluent is recycled to the first step of the method.

In another advantageous embodiment, the effluent originating from the second step (dewatering step) undergoes a physico-chemical treatment and/or a biological treatment after several recycling loops.

Within the context of the invention, the method may further comprise a step of pasteurizing the purified organic fraction obtained on completion of the first step (mechanical separation step) and/or a step of pasteurizing the purified, dewatered organic fraction obtained on completion of the second step (dewatering step).

Pasteurization allows the hygienization of the purified organic fractions with a view to complying with regulations pertaining to animal by-products insofar as the purified organic fractions to be treated are in part of animal origin and akin to category 2 or category 3 animal by-products, as described in the European regulation.

This hygienization is carried out at 70° C., for at least one hour, and also makes it possible to pre-heat the purified organic fraction prior to methanization thereof.

In another embodiment, the method of the invention further comprises, after the third step, a step of composting the organic residues.

According to a preferred embodiment, the carbon/nitrogen ratio of the dewatered organic fraction is monitored such as to optimize the third step of anaerobic biological treatment.

The carbon to nitrogen (C/N) ratio is a parameter commonly used by a person skilled in the art who will be able to measure this ratio using conventional methods. It is typically measured with the aid of a CHN analyzer or a continuous flow isotope ratio mass spectrometer (CF-IRMS).

Preferably, the carbon/nitrogen (C/N) content is between 20 and 35%, and more preferably between 24 and 28%.

Indeed, notably in the case of the recirculation of effluents such as the dewatering effluent, the dewatered organic fraction may have too high a nitrogen content as compared to the carbon content, which may have a negative impact on the anaerobic biological treatment step.

Thus, the method of the invention may comprise an optional step of adjustment of the carbon/nitrogen ratio of the dewatered organic fraction, typically by increasing the carbon content by adding carbon-rich organic materials, for example by adding waste having a high carbon content.

"Waste having a high carbon content" is understood to mean, within the sense of the present invention, waste having a C/N content above 20%, preferably between 20% and 100%. Examples of waste having high carbon content that are typically used in the invention are plant waste such as wood chips or woody green waste, but also paper and/or card.

Furthermore, when the carbon/nitrogen content is adjusted by adding waste having a high carbon content, a person skilled in the art is able to determine the quantity of waste to be added such as to arrive at the optimum carbon/nitrogen ratio range for the third step of anaerobic biological treatment.

According to another embodiment of the invention, at least a portion of the effluent originating from the anaerobic biological treatment—containing anaerobic microorganisms—is recirculated to the first, wet mechanical separation step or to the second, dewatering step, or is reused in the third step of anaerobic biological treatment.

Such a recirculation aims to maintain the bacterial population in the third step of anaerobic biological treatment such as to maintain the yield (or performance level) of said step.

The proportion of the effluent originating from the anaerobic biological treatment to be recycled in the recirculation step is variable, depending on the initial dry matter content of the waste and according to the global process applied. A person skilled in the art will be able to determine these proportions on the basis of general knowledge.

The effluent originating from the anaerobic biological treatment may be more easily recycled to the start of the process. By virtue of this recirculation, the method of the invention consumes very little water.

A further subject of the present invention is an installation for implementing the method of the invention as described above.

Said installation comprises:
- a device or a combination of devices for wet mechanical separation of non-biodegradable materials such as to obtain a purified organic fraction;
- a dewatering device for dewatering the purified fraction such as to obtain a purified, dewatered organic fraction;

a device for dry anaerobic biological treatment of the purified, dewatered organic fraction, said dewatering device being installed downstream of a mechanical separation device or combination of mechanical separation devices and upstream of a dry biological treatment device.

According to the invention, said mechanical separation device is chosen from a grinder, an agitator, a cylindrical screen, a settling device, a flotation device, or a desilting device. These devices may be used alone or in combination.

In an advantageous embodiment of the invention, said dewatering device is a piston press, such as the Bücher piston press. Alternately, it may be a filter press, notably a piston filter press, or else a plate filter press such as, for example, equipment from the FAURE EQUIPMENT company. It may also be a worm-gear press such as, for example, the STRAINPRESS press marketed by the HUBER company.

According to an advantageous embodiment, the installation comprises a recirculation loop allowing recirculation of at least a portion of the effluent containing anaerobic microorganisms obtained at the outlet from the anaerobic biological treatment device toward the inlet of the anaerobic biological treatment device, or at the inlet of the wet mechanical separation device or the combination of wet mechanical separation devices.

In an advantageous embodiment of the invention, said anaerobic biological treatment device is an anaerobic digester or fermenter operating in dry mode.

Further advantages and special features of the invention will become apparent on reading the following description, with reference to the appended FIGURE, showing:

FIG. 1 illustrates a particular embodiment of the method of the invention. In this embodiment, the organic waste 100 first undergoes a mechanical separation implemented by a plurality of mechanical separation devices, namely a grinder 20, an agitator 21, a cylindrical sieve 22 and a sand and floating trap 23.

On completion of this mechanical separation, the purified organic fraction 200 is placed in a first dewatering device 30. After this device 30, the purified, dewatered organic fraction 300 is pasteurized in a device 60 and then treated in an anaerobic biological reactor operating in dry mode 40. On completion of this treatment, organic residues 400 are dewatered in a second dewatering device 31. On completion of this step, dewatered organic residues 310 are placed in a composting device 70.

The effluent from the first dewatering 800 and the effluent from the second dewatering 810 successively undergo a physico-chemical treatment 51 and a biological treatment 52. Sludges 900 obtained in these treatments are placed in the first dewatering device 30. The effluent 820 from these treatments is recycled to the mechanical separation devices, namely the grinder 20, the agitator 21 and the cylindrical sieve 22.

Naturally, the invention is not limited to the embodiments described above with reference to the figures and variants could be envisaged without departing from the scope of the invention.

The invention claimed is:

1. A method for biological treatment of organic waste containing impurities composed of non-biodegradable materials, comprising:
   - a first step of wet mechanical separation of the non-biodegradable materials present in the aforesaid organic waste such as to obtain a purified organic fraction having a dry matter content of 6% to 20%,
   - a second step of dewatering said purified organic fraction by mechanical pressing such as to obtain a purified, dewatered organic fraction having a dry matter content of 25% to 50% and an effluent,
   - a third step of dry anaerobic biological treatment of the dewatered organic fraction such as to obtain organic residues.

2. The method as claimed in claim 1, wherein the organic waste containing non-biodegradable materials is wet waste having a dry matter content of less than 50%.

3. The method as claimed in claim 2, wherein the organic waste containing non-biodegradable materials is waste containing less than 20% non-biodegradable materials.

4. The method as claimed in claim 1, further comprising a supplementary step after the second step and before the third step, said supplementary step consisting in a step of recirculating a portion of the effluent obtained on completion of the second step toward the first wet mechanical separation step.

5. The method as claimed in claim 4, further comprising a supplementary step of physico-chemical treatment and/or a biological treatment of at least a portion of the effluent prior to recirculation.

6. The method as claimed in claim 1, wherein the organic waste containing non-biodegradable materials is waste containing less than 20% non-biodegradable materials.

7. The method as claimed in claim 1, wherein said mechanical pressing is implemented by a piston press, a worm-gear press, a piston filter press or a plate filter press.

8. The method as claimed in claim 1, further comprising a step of pasteurizing the purified organic fraction obtained on completion of the first step and/or a step of pasteurizing the purified, dewatered organic fraction obtained on completion of the second step.

9. The method as claimed in claim 1, wherein the third step is implemented in a dry digester or fermenter.

10. The method as claimed in claim 1, wherein wet mechanical separation is implemented via at least one technique selected from the group consisting of grinding, sorting by particle size, settling, desilting and flotation.

11. The method as claimed in claim 1, further comprising a step of adjustment of the carbon/nitrogen ratio of the dewatered organic fraction obtained on completion of the second step, via increasing the carbon content by adding carbon-rich organic materials.

12. The method as claimed in claim 1, wherein at least a portion of the effluent originating from the anaerobic biological treatment—containing anaerobic microorganisms—is recirculated to the first, wet mechanical separation step or to the second, dewatering step, or is reused in the third step of anaerobic biological treatment.

13. The method as claimed in claim 1, further comprising, after the third step, a step of composting the organic residues.

* * * * *